US010254521B2

(12) United States Patent
Sun et al.

(10) Patent No.: US 10,254,521 B2
(45) Date of Patent: Apr. 9, 2019

(54) OPTICAL COLLIMATOR FOR LED LIGHTS

(71) Applicant: SIGNIFY HOLDING B.V., Eindhoven (NL)

(72) Inventors: Li Wei Sun, Shanghai (CN); Yun Li, Shanghai (CN); Yan Meng Sun, Eindhoven (NL); Li Cheng, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 846 days.

(21) Appl. No.: 14/365,127

(22) PCT Filed: Dec. 4, 2012

(86) PCT No.: PCT/IB2012/056937
§ 371 (c)(1),
(2) Date: Jun. 13, 2014

(87) PCT Pub. No.: WO2013/088299
PCT Pub. Date: Jun. 20, 2013

(65) Prior Publication Data
US 2014/0316742 A1 Oct. 23, 2014

(30) Foreign Application Priority Data

Dec. 13, 2011 (WO) ................ PCT/CN2011/083883

(51) Int. Cl.
*F21K 9/20* (2016.01)
*F21V 5/00* (2018.01)
(Continued)

(52) U.S. Cl.
CPC ................ *G02B 17/08* (2013.01); *F21K 9/20* (2016.08); *F21V 5/007* (2013.01); *F21V 5/04* (2013.01);
(Continued)

(58) Field of Classification Search
CPC . F21V 5/007; F21V 5/04; F21V 5/045; F21V 7/0091; G01B 21/20;
(Continued)

(56) References Cited

U.S. PATENT DOCUMENTS 6,547,423 B2 * 4/2003 Marshall ................... F21V 5/04
257/E33.072
6,832,849 B2 * 12/2004 Yoneda ................... G01B 11/00
356/73
(Continued)

FOREIGN PATENT DOCUMENTS

CN 1037573 A 11/1989
CN 1343289 A 4/2002
(Continued)

*Primary Examiner* — Peggy A Neils
(74) *Attorney, Agent, or Firm* — Akarsh P. Belagodu

(57) ABSTRACT

There is provided a luminaire (1) and a collimating optics (2) for LED lights (5). The collimating optics (2) comprises a reflection collimator (3) having a first aperture (7) for allowing incoming light from a LED light (5) to enter the collimator (3) and a second aperture (9) for allowing outgoing light to exit the collimator (3). The reflection collimator (3) further has a wall (15) with a reflective inner surface for guiding the incoming light from the first aperture (7) towards the second aperture (9). A first convex lens (11) is arranged at a distance from the first aperture (7) for refracting the incoming light, and a second convex lens (13) is arranged at the second aperture (9) for refracting and collimating the outgoing light. With the disclosed collimating optics the collimating capability is improved without the size of the optics being increased.

19 Claims, 7 Drawing Sheets

(51) Int. Cl.
*F21V 5/04* (2006.01)
*F21V 7/00* (2006.01)
*G01B 21/20* (2006.01)
*G02B 17/08* (2006.01)
*G02B 19/00* (2006.01)
*F21Y 105/10* (2016.01)
*F21Y 115/10* (2016.01)

(52) U.S. Cl.
CPC ............ *F21V 7/0091* (2013.01); *G01B 21/20* (2013.01); *G02B 19/0028* (2013.01); *G02B 19/0066* (2013.01); *F21V 5/045* (2013.01); *F21Y 2105/10* (2016.08); *F21Y 2115/10* (2016.08)

(58) Field of Classification Search
CPC ... G02B 19/0028; G02B 19/0066; F21K 9/20; F21Y 2115/10
See application file for complete search history.

(56) References Cited

U.S. PATENT DOCUMENTS

| | | | | |
|---|---|---|---|---|
| 7,270,454 B2 * | 9/2007 | Amano | ................ | F21S 48/215 362/328 |
| 8,068,288 B1 * | 11/2011 | Pitou | ................ | G02B 3/08 359/743 |
| 8,120,048 B2 * | 2/2012 | Chen | ................ | F21V 5/04 257/95 |
| 8,246,197 B2 * | 8/2012 | Huang | ................ | F21V 5/045 362/235 |
| 8,310,685 B2 * | 11/2012 | Dimitrov-Kuhl | ................ | G02B 17/0856 356/625 |
| 8,579,472 B2 * | 11/2013 | Koizumi | ................ | F21V 5/04 362/308 |
| 8,858,022 B2 * | 10/2014 | Jiang | ................ | F21V 13/04 362/235 |
| 2002/0080615 A1 | 6/2002 | Marshall et al. | | |
| 2007/0047232 A1 | 3/2007 | Kim et al. | | |
| 2008/0030974 A1 | 2/2008 | Abu-Ageel | | |
| 2008/0037116 A1 | 2/2008 | Alasaarela et al. | | |
| 2008/0225528 A1 | 9/2008 | Holder et al. | | |
| 2009/0128921 A1 * | 5/2009 | Roth | ................ | F21V 5/04 359/641 |
| 2010/0029767 A1 * | 2/2010 | Andersson | ................ | C07C 233/54 514/563 |
| 2010/0059767 A1 | 3/2010 | Kawasaki et al. | | |
| 2013/0120985 A1 * | 5/2013 | Jiang | ................ | F21V 13/04 362/235 |
| 2013/0135358 A1 * | 5/2013 | Yin | ................ | G02B 6/0023 345/690 |

FOREIGN PATENT DOCUMENTS

| | | |
|---|---|---|
| CN | 1525098 A | 9/2004 |
| CN | 1721758 A | 1/2006 |
| CN | 201680286 U | 12/2010 |
| JP | S59143117 A | 8/1984 |
| JP | H07287226 A | 10/1995 |
| JP | 2004259541 A | 9/2004 |
| JP | 2005208571 A | 8/2005 |
| JP | 2010067439 A | 3/2010 |
| WO | 2008017718 A1 | 2/2008 |
| WO | 2011146566 A1 | 11/2011 |

\* cited by examiner

OPTICAL COLLIMATOR FOR LED LIGHTS

CROSS-REFERENCE TO PRIOR APPLICATIONS

This application is the U.S. National Phase application under 35 U.S.C. § 371 of International Application No. PCT/IB2012/056937, filed on Dec. 4, 2012, which claims the benefit of [e.g., U.S. Provisional Patent Application No. or European Patent Application No.] PCT/CN2011/083883 filed on Dec. 13, 2011. These applications are hereby incorporated by reference herein.

FIELD OF THE INVENTION

The present invention generally relates to the field of collimation of light. In particular, it relates to a collimating optics for light emitting diode (LED) lights.

BACKGROUND OF THE INVENTION

Replacement of halogen spotlighting lamps by LEDs is a growing market. Replacing halogen lamps by LEDs is quite challenging since halogen lamps and LEDs have different properties. More specifically, a difference between halogen lamps and LEDs is that LEDs have a limited flux output in comparison to halogen lamps. In order for a LED spotlight to have the same maximum intensity at specific beam angles as a halogen spotlight, the optics of the LED spotlight therefore needs to provide a much higher intensity in the center of the beam per unit flux in order to compensate for the limited flux output. The intensity in the center of the beam per unit flux is often referred to as center beam candle power (CBCP) per lumen value, or simply Cd/lm or CBCP/lm.

In view of the above, it is thus a challenge in LED spotlighting optics to design a compact and efficient optics in a very limited space to get a higher CBCP/lm value for specific beam angles.

LED spotlighting optics typically comprise a total internal reflection (TIR) collimator having an opening for receiving a LED, and a central convex lens which is arranged at a distance from the opening where the LED is received. However, with such an arrangement it is difficult to collimate and redistribute the light coming through the central convex lens because the lens is positioned too close to the LED source whose size is negligible. Due to this limitation of the central lens, the light intensity distribution of the output light beam gets undesirably heavy tails and thereby it is difficult to get certain beam pattern having high CBCP/lm values at specific full width half maximum (FWHM) beam angles. The FWHM beam angles are defined by the angles relatively the center of the beam for which the light intensity is half the light intensity of the center of the beam.

SUMMARY OF THE INVENTION

It is an object of the present invention to overcome or at least mitigate the problems discussed above, and to provide a collimating optics and a luminaire having an improved CBCP per lumen performance. In particular, it is an object to provide a collimating optics and a luminaire having an improved collimating capability without increasing the size of the optics.

According to a first aspect of the invention, this and other objects are achieved by a collimating optics for light emitting diode, LED, lights, comprising: a reflection collimator having a first aperture for receiving a LED light and for allowing incoming light from the LED light to enter the collimator and a second aperture for allowing outgoing light to exit the collimator, the reflection collimator further having a wall element extending from the first aperture to the second aperture and having an inner reflective surface for guiding the incoming light from the first aperture towards the second aperture; a first convex lens arranged at a distance from the first aperture for refracting the incoming light; and a second convex lens arranged at the second aperture for refracting the outgoing light so as to collimate the outgoing light.

Preferably the first convex lens arranged at a distance from the first aperture such that the first convex lens is arranged between the first aperture and the second aperture. By provision of a second convex lens at the second aperture, the light beams having been refracted by the first convex lens are further refracted and collimated by the second convex lens. Thereby, the collimating capability of the collimating optics is improved although the size of the collimating optics has not been increased. In particular, for a fixed value of the flux, the maximum intensity value may be increased since the second convex lens redistributes the light such that the light intensity distribution is more concentrated to the center of the light beam compared to if no second convex lens is present. At the same time as the maximum intensity value is improved, the FWHM beam angle is kept essentially the same. In other words, the CBCP per lumen performance is improved. As a result, fewer LED lamps, that is a lower flux, may be used in case the CBCP is to be kept at the same level as before. Alternatively, in case the same number of LED lamps is used, a higher CBCP value may be achieved.

The first and second convex lenses may be Fresnel lenses, each having a plurality of facets. The facets are sometimes referred to as Fresnel zones. In case a simple convex lens is used, an image of the shape of the LED die may be visible in an illumination spot caused by the collimating optics. However, this is not the case if Fresnel lenses are used since Fresnel lenses redistribute the light in an interlacing way. More specifically, the mutual order of the light rays in a bundle of light rays incident on the first convex lens changes as the bundle of light rays passes and are refracted by the first and the second convex lenses. As a result, the visual uniformity of an illumination spot caused by the collimating optics is improved.

The visual uniformity increases with the number of facets of the Fresnel lenses. In one embodiment, the number of facets of the first convex lens and/or the second convex lens is 3, 4 or 5.

The collimating optics may further comprise a surface plate covering at least part of the second aperture. The second convex lens may be arranged at the surface plate. This is advantageous in that it provides an easy and flexible way of arranging the second convex lens. Further, the second convex lens may easily be incorporated with an existing collimating optics. For example the second convex lens may be arranged in a recess of the surface plate. Alternatively, the second convex lens may be arranged on an outer surface of the surface plate. Yet alternatively, the second convex lens may be arranged at an inner surface of the surface plate.

Preferably, an optical axis of the first convex lens and an optical axis of the second convex lens are aligned with an optical axis of the collimating optics, the optical axis of the reflection collimator extending from the first aperture towards the second aperture. This may be achieved in case the lenses are arranged substantially transverse to the optical axis of the reflection collimator. This is advantageous in that the collimating optics is symmetric such that the collimation of light beams is isotropic.

The wall element of the reflection collimator may further comprise a first portion comprising the first aperture and a second portion comprising the second aperture, wherein the first portion of the wall element is arranged to diverge incoming light incident on the first portion so as to guide the incoming light away from the second convex lens, and wherein the second portion of the wall element is arranged to collimate incoming light. This is particularly advantageous in case the diameter of the second convex lens is larger than a bottom diameter of the reflection collimator. In such a case, a considerable part of the light rays being reflected by the reflection collimator to be guided towards the second aperture may be blocked by the second convex lens, resulting in loss of optical efficiency and a loss in the CBCP value. With the above arrangement, such blocking of light rays by the second convex lens is avoided and hence the efficiency and the CBCP value is improved.

According to a second aspect of the invention, this and other objects are achieved by a luminaire comprising at least one collimating optics according to the first aspect, and at least one light emitting diode, LED, arranged to emit light through the first aperture of one of the at least one collimating optics.

Each LED of the luminaire may have a corresponding collimating optics. Further, each LED may be arranged to emit light through the first aperture of its corresponding collimating optics. This is advantageous in that the flux is increased by having several LEDs and that the light from each LED is individually collimated to get an improved CBCP value for each LED.

The luminaire may comprise at least two LEDs being arranged to emit light through the first aperture of a common collimating optics. By having at least two LEDs sharing a common collimating optics, the luminaire may be made more compact.

According to a third aspect of the invention, this and other objects are achieved by a method for determining parameters of the collimating optics according to the first object, the parameters being related to the shape of the first and the second convex lens, and to the shape of the wall element of the reflection collimator, the method comprising: determining start values of the parameters based on a theoretical model of the collimating optics, optimizing a merit function with respect to the parameters of the collimating optics using the determined start values as initial values, wherein the merit function comprises a first target function related to a desired full width half maximum, FWHM, beam angle and a second target function related to a maximal light intensity in the center of a light beam output from the collimating optics.

The merit function may further comprise a third target function being related to a desired beam profile.

The shape of the wall element may further be modeled by means of a set of Bezier curves having a corresponding set of Bezier parameters, and wherein the parameters of the collimating optics comprises a radius of curvature of the first convex lens, a radius of curvature of the second convex lens, and the set of Bezier parameters.

The advantages and features of the first aspect generally apply to the second and the third aspects.

It is noted that the invention relates to all possible combinations of features recited in the claims.

BRIEF DESCRIPTION OF THE DRAWINGS

These and other aspects of the present invention will now be described in more detail, with reference to the appended drawings showing embodiment(s) of the invention.

FIG. 6b is a top plan view of the luminaire of FIG. 6a.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION OF THE EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
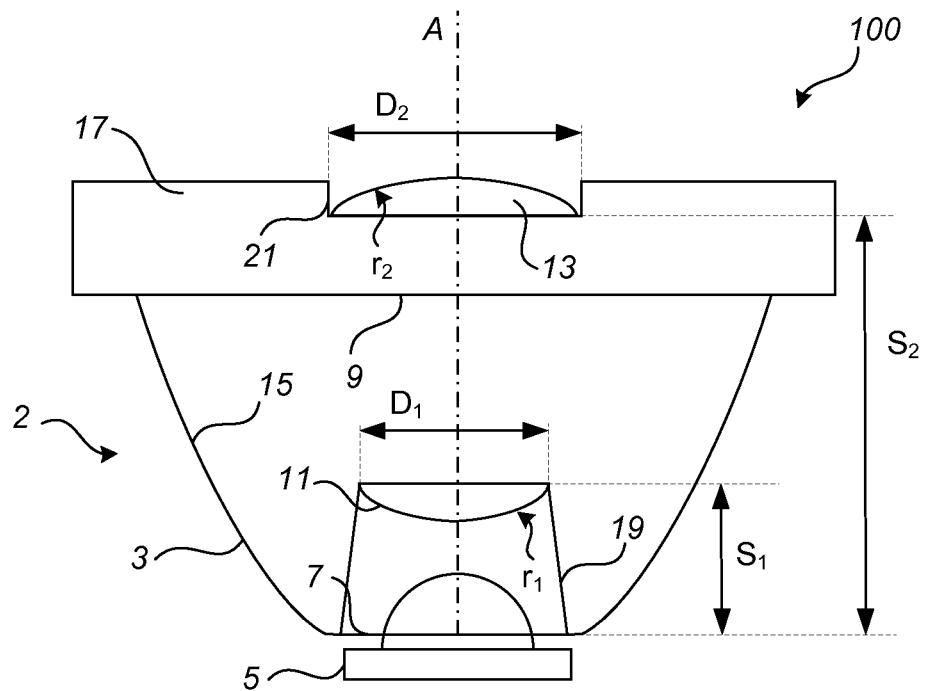
FIGS. 1-2 are cross-sectional views of luminaires comprising a collimating optics according to embodiments.

FIG. 1 illustrates a luminaire 100 comprising a collimating optics 2 and a LED light 5. The collimating optics 2 comprises a reflection collimator 3 such as a total internal reflection collimator. The reflection collimator 3 has a first aperture, or opening, 7 for receiving the LED light 5 and for allowing incoming light from the LED light 5 to enter the collimator 3. Further, the reflection collimator 3 has a second aperture, or opening, 9 for allowing outgoing light to exit the reflection collimator 3. The second aperture 9 is typically of larger size (diameter) than the first aperture 7. The reflection collimator 3 further has a wall element 15 extending from the first aperture 7 to the second aperture 9. The inner surface of the wall element 15 is reflective so as to guide the incoming light from the first aperture 7 towards the second aperture 9, thus forming a total internal reflection collimator.

The reflection collimator 3 may be rotation-symmetric about an optical axis A of the reflection collimator 3 extending in a direction from a centre of the first aperture 7 towards a centre of the second aperture 9. Here, the reflection collimator 3 has a general cup-shaped form with the first aperture 7 being located at the center of the bottom of the cup and the second aperture 9 corresponding to the top opening of the cup.

A first convex lens 11 having a diameter $D_1$ is arranged at a distance $S_1$ from the first aperture 7. The distance $S_1$ may be approximately equal to or close to the focal distance of the first convex lens 11. The first convex lens 11 has a radius of curvature $r_1$. The illustrated first convex lens 11 is a planoconvex lens. The planar surface of the planoconvex lens faces away from the first aperture 7. In some cases, the first convex lens may be a conic convex lens. Further, other aspheric lens structures may be used to replace the spherical surface of the first convex lens 11.

Preferably, the optical axis of the first convex lens 11 corresponds to the optical axis A of the reflection collimator 3. If so, the first convex lens 11 is said to be arranged transverse to the optical axis A.

The first convex lens 11 may generally be connected to, or supported by, the reflection collimator 3 via holding means 19. The holding means 19 may be an integral part of the reflection collimator 3. For example, the first convex lens 11 may be connected to the reflection collimator 3 via holding means 19 which is attached to the reflection collimator 3 and which is arranged to hold the first convex lens 11 at a distance from the first aperture 7. In the illustrated example, the holding means 19 are realized by an inner wall element 19 being part of the reflection collimator 3 and extending from the first aperture 7 in the direction of the second aperture 9. The upper end of the inner wall element 19 defines an opening being located at a distance $S_1$ from the first aperture 7. The opening may receive and hold the first convex lens 11. In alternative embodiments, the holding means 19 may comprise a frame which is arranged in the reflection collimator 3 and which is adapted to hold the first convex lens 11. Alternatively, the first convex lens 11 may be connected to the reflection collimator 3 via rods.

A second convex lens 13 having a diameter $D_2$ is arranged at the second aperture 9 at a distance $S_2$ from the first aperture 7. More precisely, the second convex lens 13 is arranged to cover at least parts of the second aperture 9. The second convex lens 13 has a radius of curvature $r_2$. The illustrated second convex lens 13 is a planoconvex lens. The planar surface of the planoconvex lens faces the second aperture 9. In some cases, the second convex lens 13 may be a conic convex lens. Further, other aspheric lens structures may be used to replace the spherical surface of the second convex lens 13. The second convex lens 13 typically has the same refractive index n, say, as the first convex lens 11.

Preferably, the optical axis of the second convex lens 13 corresponds to the optical axis A of the reflection collimator 3. If so, the first convex lens is said to be arranged transverse to the optical axis A.

There are many possible alternatives for how to arrange the second convex lens 13 at the second aperture 9. In the illustrated embodiment, the collimating optics 2 comprises a surface plate 17. Generally, the surface plate 17 may cover at least part the second aperture 9. Here, the surface plate 17 covers the whole second aperture 9. The surface plate 17 is preferably made of a translucent material. The surface plate 17 is adapted to hold the second convex lens 13. More precisely, the surface plate 17 may comprise a recess 21 which preferably is centered about the optical axis A and in which the second convex lens 13 may be arranged. Alternatively, the second convex lens 13 may be arranged on top of the surface plate 17. Yet alternatively, the surface plate 17 may comprise a hole being centered about the optical axis A in which the second convex lens 13 may be arranged.

In other embodiments, the second convex lens 13 is neither held nor supported by a surface plate 17. For example, the second convex lens 13 may be held by a frame which is attached to the reflection collimator 3 or by rods extending from the reflection collimator 3.

Figure 9:
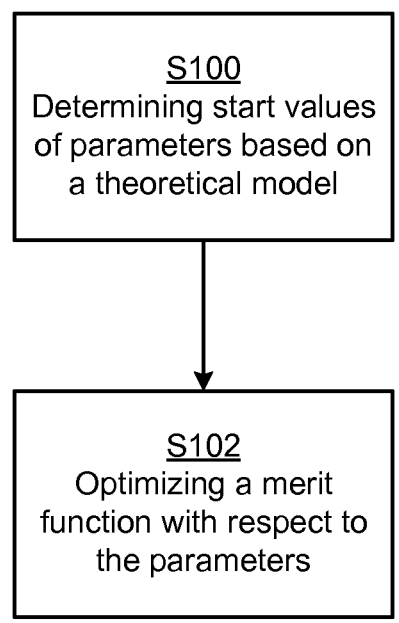
FIG. 9 is a flowchart of a method according to embodiments.

The diameters $D_1$ and $D_2$ and the radiuses of curvature $r_1$ and $r_2$ may be varied such that a prescribed beam angle and a desired beam pattern are obtained. More precisely, the diameters $D_1$ and $D_2$ and, in particular, the radii of curvature $r_1$ and $r_2$ may be determined according to an optimization procedure which will now be described with respect to the flowchart of FIG. 9.

In a first step S100 of such an optimization procedure a start value for the diameters $D_1$ and $D_2$ and radii $r_1$ and $r_2$ are determined. For example, the start values may be calculated based on a theoretical calculation being based on a point source model and paraxial conditions. More precisely, the start values may be determined according to the following equations:

$$D_2 = D_1 \cdot \left(1 + \frac{S_2 \cdot (n-1)}{r_1} - \frac{S_2}{S_1}\right),$$

$$r_2 = \frac{(n-1)}{\frac{(n-1)}{r_1} - \frac{1}{S_1}} + S_2 \cdot (n-1),$$

$$r_1 < (n-1) \cdot S_1,$$

where n is the refractive index of the first convex lens 11 and the second convex lens 13. The start value of $D_1$ may be determined based on a desired ratio between the light energy that passes through the first convex lens 11 and the light energy that is directed towards the wall element 15 of the reflection collimator 3. The desired ratio may be determined by taking several practical considerations into account. For example, the wall element 15 of the reflection collimator 3 is more efficient in redistributing the beam pattern of a LED source to obtain a high CBCP in comparison to the first convex lens 11. For this reason, it is advantageous if $D_1$ is small such that as much of the light energy as possible is directed towards the wall element 15 without passing the first convex lens 11. However, at the same time $D_1$ should not be too small, since a too small diameter D1 may lead to energy losses at the surface plate 17. More precisely, for a given optical space, the light redistribution capability of the wall element 15 of the reflection collimator 3 is limited. As a result, light may be subject to total reflection at the surface plate 17. Other factors influencing the choice of $D_1$ are the size and the original beam pattern of the light source used and the given optical size.

Since all real sources have a geometrical extent, the above start values do typically not give the desired beam pattern. Therefore, in a next step S102 of the method, the above start values are used as input to an optimization algorithm.

The merit function used in the optimization comprises several target functions. For example, the merit function may be a sum of several target functions. Firstly, the merit function is based on a desired FWHM beam angle. It is important to take the FWHM beam angle into account since it is desirable to increase the CBCP while keeping the FWHW beam angle essentially constant.

Secondly, the merit function is based on the CBCP/lm maximum value. By combining the desired FWHM beam angle and the CBCP/lm value in the same merit function, a local or global optimum value of CBCP for a desired FWHM beam angle may be obtained.

Thirdly, and optionally, the merit function may be based on a desired beam profile. For example, the desired beam profile may be a parametric beam profile such as a Gaussian beam profile. Preferably, the merit function is based on a desired beam profile only in case it is difficult to find a solution based on the first and second target functions.

The optimization parameters may be divided into two groups, namely parameters relating to the first and the second convex lens 11 and 13, and parameters relating to the shape of the wall element 15 of the reflection collimator 3.

More precisely, the optimization parameters may comprise the radius of curvature $r_1$ of the first convex lens 11 and the radius of curvature $r_2$ of the second convex lens 13 in order to optimize the collimation of the light energy that passes through the lenses 11 and 13. In case aspheric lenses are used, the optimization parameters may instead comprise the corresponding parameters for the aspheric lenses. Optionally, the optimization may also comprise the diameters $D_1$ and $D_2$ of the first and the second convex lens 11 and 13.

In order to optimize the collimation of the light energy that is reflected by the reflection collimator 3 without passing the first convex lens 11, the optimization parameters may comprise parameters relating to the shape of the wall element 15 of the reflection collimator 3. Start values of these parameters may also be determined in step S100. For example, the wall element 15 may be modeled by means of Bezier curves. If so, the optimization parameters may comprise the coefficients of the Bezier curves. In case Bezier curves are not suitable for modeling the shape of the wall element 15, other types of aspheric profile curves may be used to model the shape of the wall element 15. In that case, the optimization parameters may comprise the coefficients of the aspheric profile curves.

Alternatively, the optimization may be performed in a sequential fashion. For example, first the parameters could be optimized with respect to the first target function. Then, in a separate step, the parameters could be optimized with respect to the second target function. Similarly, the parameters could be optimized separately with respect to the third target function.

The function of the luminaire 100 will now be described with reference to FIGS. 3a-b and FIG. 8.

Figure 3A:
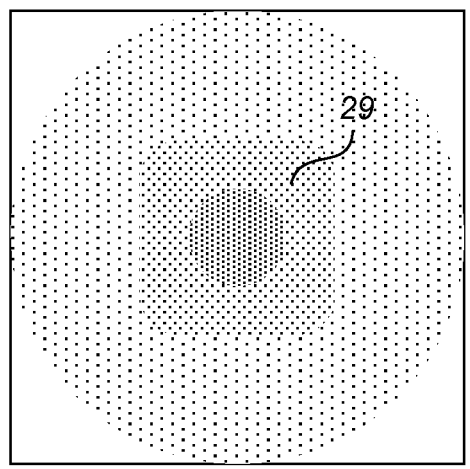
FIGS. 3a-b and 4a-b illustrates beam paths of luminaires according to embodiments and corresponding illumination spots.
Figure 3B:
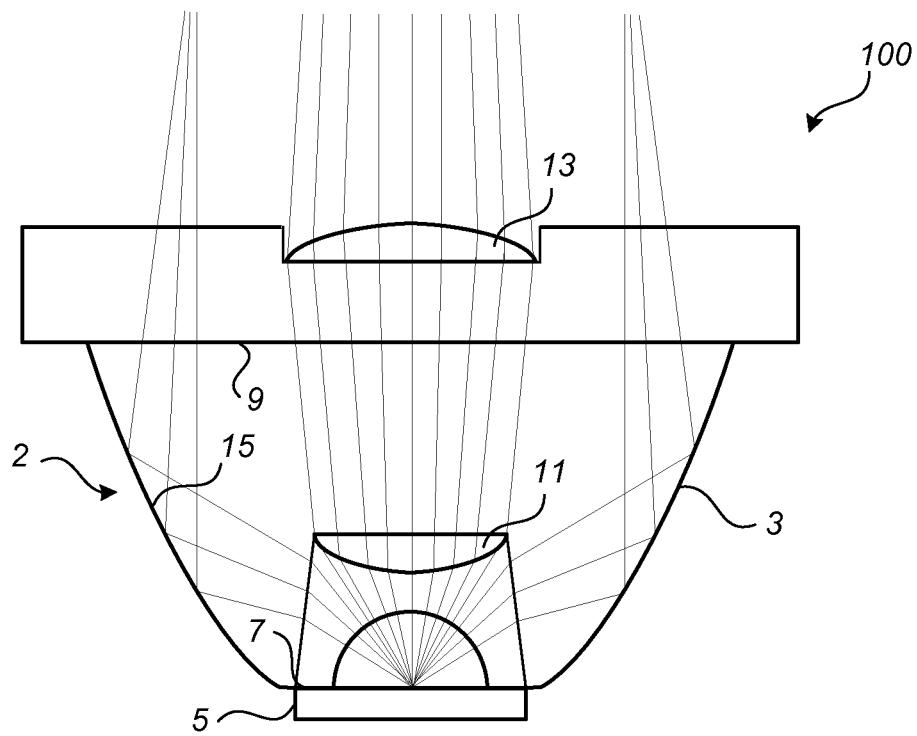

In FIG. 3b the beam paths of the luminaire 100, when in use, are illustrated. Incoming light originating from the LED light 5 enters the reflection collimator 3 via the first aperture 7. The incoming light that falls outside of the first convex lens 11 is reflected by the reflective surface 15 of the reflection collimator 3 to be guided towards the second aperture 9.

The incoming light that falls in on the first convex lens 11 is collimated by the first convex lens 11. In case the LED light 5 is located in the focal point of the first convex lens 11, the first convex lens 11 collimates the light incident on the lens to a bundle of essentially parallel rays. However, due to size restrictions of the reflection collimator 3, the first convex lens 11 is typically located at a distance from the LED being shorter than the focal distance. As a result, the bundle of rays leaving the first convex lens 11 is diverging.

The bundle of rays collimated by the first convex lens 11 then falls in on the second convex lens 13. Preferably, the size of the second convex lens 13 is larger than the first convex lens 11 such that each light ray in the bundle of rays having passed the first convex lens 11 hits the second convex lens 13. The second convex lens 13 further collimates the incoming bundle of rays. Thus, by provision of the second convex lens 13, the collimating capability of the collimating optics 2 is improved without increasing the size of the optics.

Figure 8:
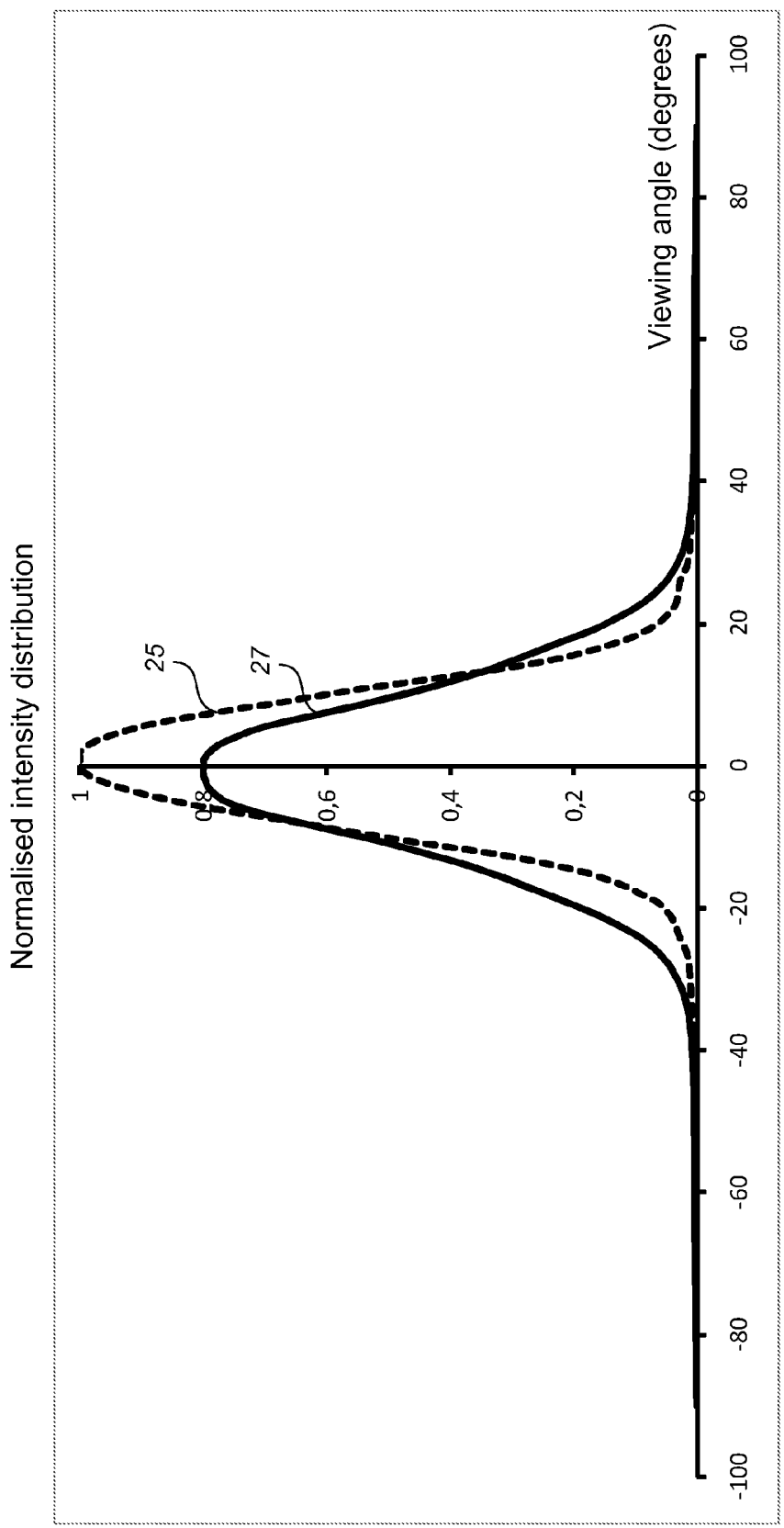
FIG. 8 is a graph of normalized intensity distribution as a function of viewing angle.

In FIG. 8, the performance of a collimating optics 2 comprising a second convex lens 13 is compared to the performance of a collimating optics without a second convex lens 13. FIG. 8 shows normalized intensity distributions 25 and 27 of a collimating optics 2 with a second convex lens 13 and without a second convex lens 13, respectively. Both intensity distributions correspond to a full width half maximum (FWHM) of 21 degrees. As can be seen in the graph, the center beam candle power (CBCP), that is, the central maximum intensity is about 25% higher for the collimating optics 2 having a second convex lens 13. Further, the tails of the distribution 25 are much lighter than the tails of the distribution 27. This means that the light intensity of the optical collimator 2 having a second convex lens 13 is more focused to the center of the beam in comparison to the light intensity of the optical collimator without a second convex lens. Thus, by provision of the second convex lens 13, the light intensity may be redistributed such that a light intensity distribution which is more focused around the center of the beam and which has a higher central maximum is obtained.

In practice, the provision of a second convex lens 13 has several consequences. At one hand, for the same light flux, a higher central maximum intensity may be obtained than with an optical collimator without a second convex lens. On the other hand, the same central maximum intensity as for a collimating optics without a second convex lens may be obtained with a lower light flux. The latter thus implies that less LEDs may be used.

FIG. 3a illustrates an illumination spot 29 which may be obtained by directing the luminaire 100 towards a surface. The center of the beam spot 29 has a square-like shape. This is due to the fact that the LED die typically has a rectangular shape and that this shape is imaged by the first and the second convex lenses 11 and 13.

Figure 2:
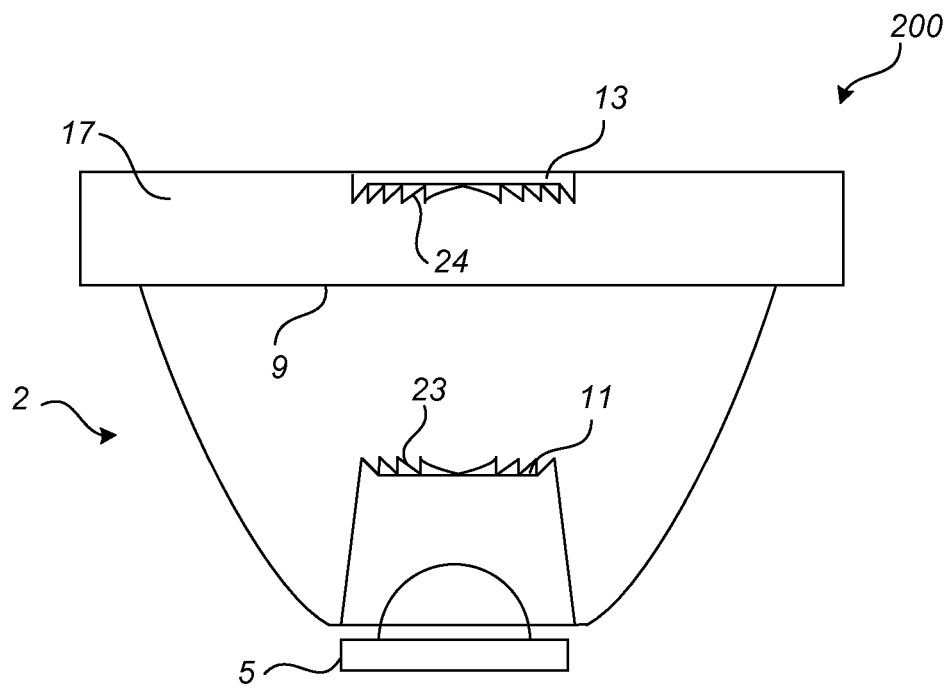

FIG. 2 illustrates a luminaire 200 comprising a collimating optics 2 and a LED light 5. The collimating optics 2 of the luminaire 200 differs from the collimating optics 2 of the luminaire 100 in that the first and the second convex lenses 11 and 13 are Fresnel lenses. Each of the first and the second convex lenses 11 and 13 comprises a plurality of facets 23 and 24, respectively, also known as Fresnel zones. The facets 23 are concentric annular sections of the lenses 11 and 13. The number of facets 23 of the first convex lens 11 and the second convex lens 13 may be different. In one embodiment the number of facets of the first convex lens and/or the second convex lens is 3, 4 or 5. In the illustrated embodiment, the first convex lens 11 has four facets and the second convex lens 13 has five facets. By varying the number of facets 23 and 24 and matching the sizes of the first convex lens 11 and the second convex lens 13, the intensity value of the central beam of the output light may be optimized. Thus, the number of facets 23 and 24 are parameters which may be tuned in order to optimize the performance of the optical collimator 2.

Similar to the disclosure with respect to FIG. 1, the second convex lens 13 may be arranged in different ways at the second aperture 9. In the illustrated example, the second convex lens 13 is arranged at an inner surface of the surface plate 17. Preferably, in order to simplify the manufacturing of the collimating optics 1, the second convex lens 13 is formed integrally with the surface plate 17. Moreover, the whole collimating optics 1 is preferably formed in one piece comprising only one kind of material such as plastics.

The function of a luminaire comprising Fresnel lenses as first and second convex lenses 11 and 13 will now be described with respect to FIGS. 4a-b.

Figure 4A:
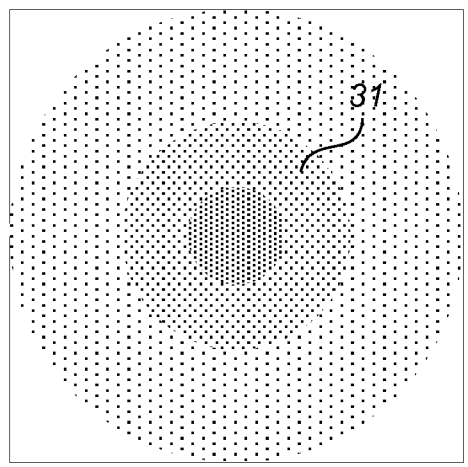
Figure 4B:
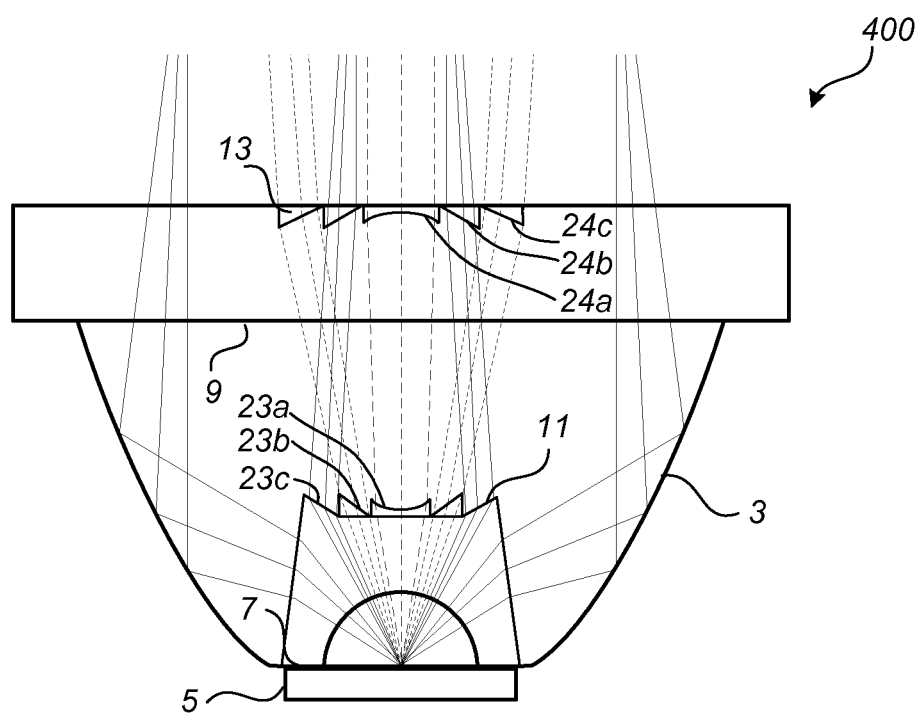

FIG. 4b illustrates a luminaire 400 having a first convex lens 11 being a Fresnel lens with three facets 23a-b, and a second convex lens 13 being a Fresnel lens with three facets 24a-c.

Incoming light originating from the LED 5 enters the reflection collimator 3 via the first aperture 7. The incoming light that falls on the first convex lens 11 is collimated by the first convex lens 11. Due to the facet structure of the first convex lens 11, the incoming light rays are collimated in an interlacing manner, meaning that the mutual order of the rays in the incoming bundle of rays is different than the mutual order of the rays in the outgoing bundle. More precisely, the refraction of the incoming light rays depends on which facet 23a-c the light rays fall in on.

In the illustrated example, the first and the second convex lenses 11 and 13 are arranged such that the light rays that fall in on the facet 23a of the first convex lens 11 are refracted and directed towards the facet 24a of the second convex lens 13. Further, the light rays that fall in on the facet 23b of the first convex lens 11 are refracted and directed towards the facet 24c of the second convex lens 13. Similarly, the light rays that fall in on the facet 23c of the first convex lens 11 are refracted and directed towards the facet 24b of the second convex lens 13. The bundle of light rays that has been collimated and interlaced by the first convex lens 11 is then further collimated by the convex lens 13.

The performance of the luminaires 200 and 400 comprising Fresnel lenses is comparable to that of the luminaire 100 in terms of maximum light intensity at the center of the beam. However, the luminaires 200 and 400 have further advantages which will now be explained with respect to FIG. 4a.

FIG. 4a illustrates a beam spot 31 obtained by directing a luminaire 200 or 400 comprising a first and a second convex lens 11 and 13 both being Fresnel lenses towards a surface. The beam spot 31 has a uniform and circular-symmetric appearance. In particular, the beam spot 31 does not comprise a rectangular-shaped image of the LED die. This is due to the fact that the Fresnel lenses interlace, i.e., redistributes the light paths originating from the LED 5 as explained above.

By increasing the number of facets 23 and 24 applied in the Fresnel structure, the uniformity performance of the beam spot 31 may be improved. This is due to the fact that an increased number of facets results in a higher capability of redistribution or interlacing of the light rays from the LED 5. Thus, the number of facets 23 and 24 are parameters which may be tuned to optimize the uniformity performance of the beam spot 31 as well as to optimize the maximum intensity of the central beam of output light.

Figure 5A:
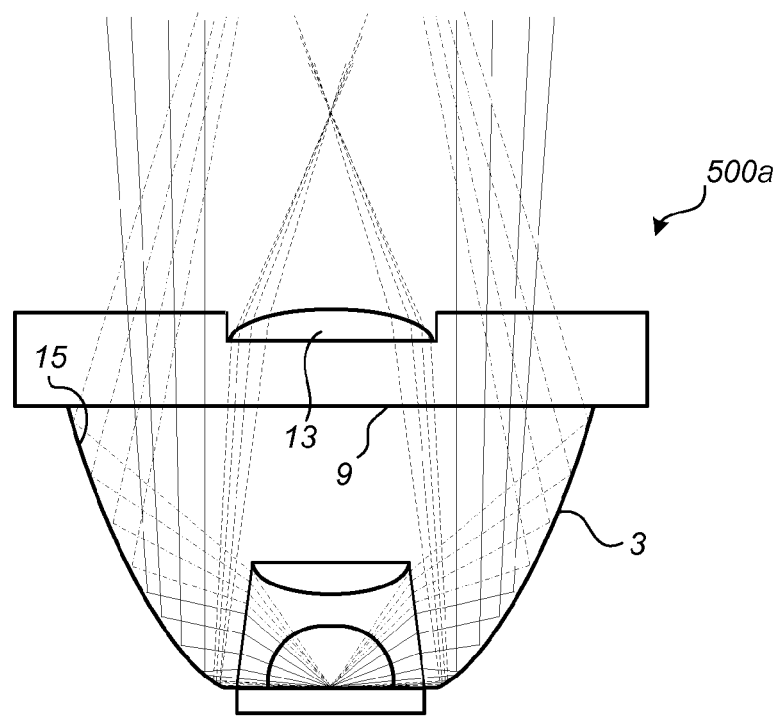
FIGS. 5a-b illustrates beam paths of luminaires according to embodiments.

FIG. 5a illustrates a luminaire 500a similar to that of FIG. 1. In particular, FIG. 5a illustrates the beam paths of light beams being reflected by the reflection collimator 3. The beams being reflected by the inner surface 15 are guided towards the second aperture 9. However, in case the diameter of the second convex lens 13 is larger than the bottom diameter of the reflection collimator 3, some of the beams are directed towards the second convex lens 13. This is an undesired feature, since the beams that fall in on the second convex lens 13 are strongly collimated and may lead to a drop in the central beam intensity. The drop in intensity depends on how much light that hits the top central lens after having been reflected by the reflection collimator 3.

Figure 5B:
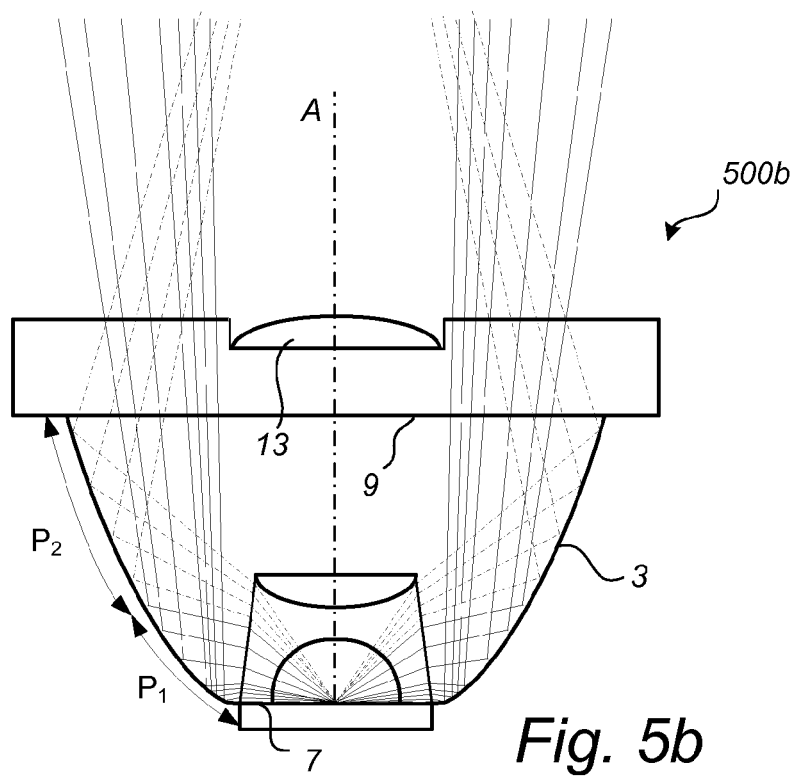

FIG. 5b illustrates a luminaire 500b according to an alternative embodiment. The luminaire 500b has a reflection collimator 3 with a wall element having two portions $P_1$ and $P_2$. Portion $P_1$ comprises the first aperture 7 and the second portion $P_2$ comprises the second aperture 9. The first portion $P_1$ is arranged to diverge incoming light. More precisely, the curvature of the wall element at the first portion $P_1$ is arranged such that an incident bundle of light rays is reflected in a diverging manner with respect to the optical axis A of the luminaire 500b. Typically, the curvature of the wall element at the first portion $P_1$ is larger than the curvature of the corresponding portion of the wall element of luminaire 500a. In this way, the incoming light is guided away from the second convex lens 13. Similarly, the second portion $P_2$ is arranged to collimate incoming light. Particularly, the curvature of the wall element at the second portion $P_2$ is arranged such that an incident bundle of light rays is reflected in a collimating manner with respect to the optical axis A of the luminaire 500b.

In practice, the shape of the wall element 15 at the first portion $P_1$ may be modeled by a first set of Bezier curves having a first set of Bezier parameters. Similarly, the shape of the wall element 15 at the second portion $P_2$ may be modeled by a second set of Bezier curves having a second set of Bezier parameters. The first set of Bezier parameters and the second set of Bezier parameters may be optimized in accordance with an optimization method as disclosed above. In particular, the start values for the optimization of the first set of Bezier parameters may be chosen such that an incident bundle of light rays on the first portion $P_1$ is reflected in a diverging manner. Similarly, the second set of Bezier parameters may be chosen such that an incident bundle of light rays on the second portion $P_2$ is collimated or is reflected in a converging manner. Since the first and the second portions $P_1$ and $P_2$ have their own set of Bezier parameters, the optimization may be carried out individually for the two portions $P_1$ and $P_2$.

Figure 6A:
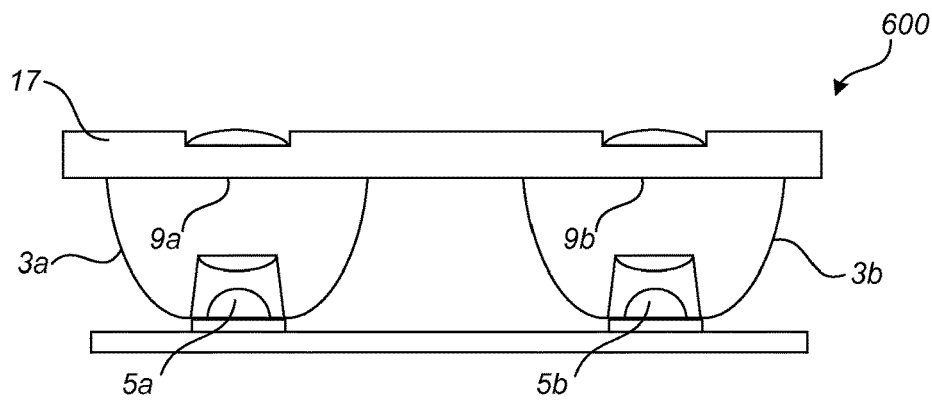
FIG. 6a is a cross-sectional view of a luminaire according to embodiments.
Figure 6B:
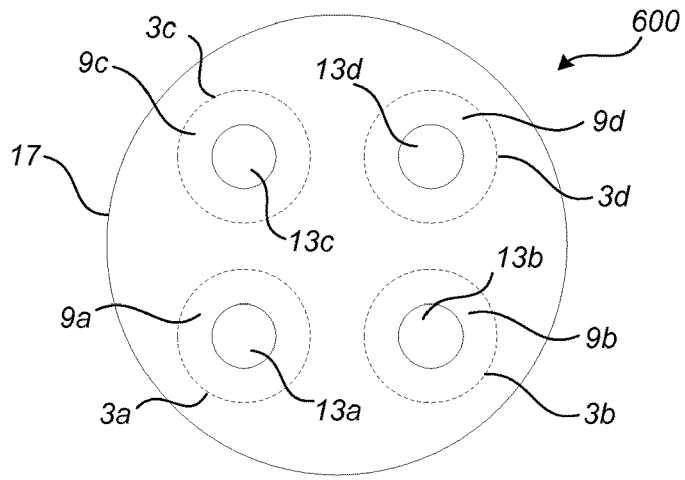

FIGS. 6a-b illustrate a luminaire 600 comprising several LEDs and several collimating optics. In principle, any number of LEDs and collimating optics are possible. Here, for illustration purposes, four LEDs 5a-d and four collimating optics 3a-d are shown.

Each LED 5a-d corresponds to one collimating optics 3a-d. For example, in the illustrated example, the LED 5a corresponds to the collimating optics 3a and the LED 5b corresponds to the collimating optics 3b. The collimating optics 3a-d may be of any of the types disclosed herein. In particular, the LEDs 5a-d may be received in a first aperture of their corresponding collimating optics 3a-d such that the LEDs thereby are arranged to emit light through the first aperture of their corresponding collimating optics. The luminaire 600 further comprises a surface plate 17 which covers all of the second apertures 9a-d of the collimating optics 3a-d. The illustrated surface plate 17 may have a circular shape when seen from above.

Figure 7:
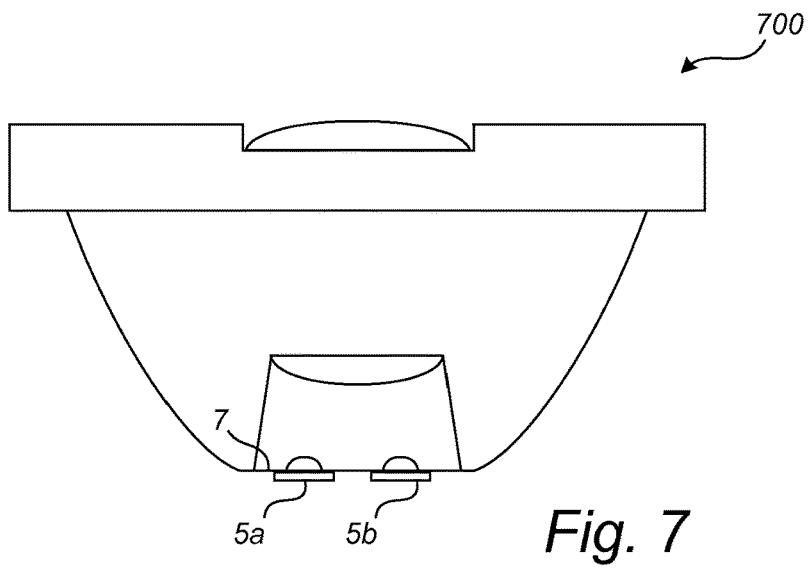
FIG. 7 is a cross-sectional view of a luminaire according to embodiments.

FIG. 7 illustrates an alternative embodiment of a luminaire 700 comprising several LEDs. The luminaire 700 comprises a plurality of LEDs. Here, for illustration purposes, two LEDs 5a-b are shown. The luminaire 700 further comprises a collimating optics 3 according to any of the embodiments previously disclosed. The plurality of LEDs 5a-b are arranged to be received in the first aperture 7 of the collimating optics 3. Thus, the plurality of LEDs are arranged to emit light through the first aperture 7 of a common collimating optics 3.

The person skilled in the art realizes that the present invention by no means is limited to the preferred embodiments described above. On the contrary, many modifications and variations are possible within the scope of the appended claims. For example, the embodiments disclosed with respect to FIGS. 6 and 7 could be combined into a luminaire comprising several collimating optics similar to the embodiment of FIGS. 6*a-b*, but wherein each collimating optics is associated with several LEDs as shown in FIG. 7.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A collimating optics for light emitting diode lights (LEDs), comprising:
    a reflection collimator having a first aperture for receiving an LED light and for allowing incoming light from the LED light to enter said collimator and a second aperture for allowing outgoing light to exit said collimator, the reflection collimator further having a wall element extending from said first aperture to said second aperture and having an inner reflective surface for reflecting a first portion of said incoming light from said first aperture towards said second aperture,
    a first convex lens arranged at a distance from the first aperture for refracting a second portion of said incoming light, and
    a second convex lens arranged at the second aperture for refracting said outgoing light so as to collimate said outgoing light,
    wherein the wall element comprises a first portion that is configured to reflect and diverge incoming light incident on the first portion such that said reflected, divergent light is guided away from the second convex lens;
    wherein the first portion of the wall element comprises the first aperture;
    wherein the wall element comprises a second portion comprising the second aperture; and
    wherein the second portion of the wall element is configured to reflect and collimate incoming light incident on the second portion.

2. The collimating optics according to claim 1, wherein the first and the second convex lenses are Fresnel lenses each having a plurality of facets.

3. The collimating optics according to claim 2, wherein the number of facets of the first convex lens and the second convex lens are different.

4. The collimating optics according to claim 3, wherein the number of facets of the first convex lens or of the second convex lens is 3, 4 or 5.

5. The collimating optics according to claim 1, further comprising
    a surface plate covering at least part of the second aperture, wherein the second convex lens is arranged at the surface plate.

6. The collimating optics according to claim 5, wherein the second convex lens is arranged in a recess of the surface plate.

7. The collimating optics according to claim 5, wherein the second convex lens is arranged on an outer surface of the surface plate.

8. The collimating optics according to claim 1, wherein an optical axis of the first convex lens and an optical axis of the second convex lens are aligned with an optical axis of the reflection collimator, the optical axis of the reflection collimator extending from the first aperture towards the second aperture.

9. A luminaire comprising at least one collimating optics according to claim 1, and at least one light emitting diode, LED, arranged to emit light through the first aperture of one of the at least one collimating optics.

10. The luminaire according to claim 9, wherein each LED of the at least one LED has a corresponding collimating optics, and wherein each LED is arranged to emit light through the first aperture of its corresponding collimating optics.

11. The luminaire according to claim 9, comprising at least two LEDs being arranged to emit light through the first aperture of a common collimating optics.

12. A method for producing collimating optics comprising: determining start values of parameters of the collimating optics, said parameters being related to the shape of first and second convex lenses of said collimating optics and to the shape of a wall element of a reflection collimator, based on a theoretical model of the collimating optics;
    optimizing a merit function with respect to the parameters of the collimating optics using the determined start values as initial values, wherein the merit function comprises a first target function directed to a desired full width half maximum (FWHM) beam angle and a second target function directed to a maximal light intensity in the center of a light beam output from the collimating optics when said collimating optics are employed with a light source; and
    producing said collimating optics having the parameters optimized in accordance with said optimizing,
    wherein the wall element comprises a first portion that is configured to reflect and diverge incoming light incident on the first portion such that said reflected, divergent light is guided away from the second convex lens;
    wherein the first portion of the wall element comprises a first aperture for receiving an LED light;
    wherein the wall element comprises a second portion comprising a second aperture for allowing outgoing light to exit; and
    wherein the second portion of the wall element is configured to reflect and collimate incoming light incident on the second portion.

13. The method according to claim 12, wherein the merit function further comprises a third target function being related to a desired beam profile.

14. The method according to claim 12, wherein the shape of the wall element is modeled by means of a set of Bezier curves having a corresponding set of Bezier parameters, and wherein the parameters of the collimating optics comprises a radius of curvature of the first convex lens, a radius of curvature of the second convex lens and the set of Bezier parameters.

15. The method of claim 12, wherein the light source comprises light emitting diode lights (LEDs), and wherein the collimating optics comprise:
    the reflection collimator, said reflection collimator having a first aperture for receiving an LED light and for allowing incoming light from the LED light to enter said collimator and a second aperture for allowing outgoing light to exit said collimator, the reflection collimator further having a wall element extending from said first aperture to said second aperture and having an inner reflective surface for reflecting a first portion of said incoming light from said first aperture towards said second aperture,
    the first convex lens, wherein the first convex lens is arranged at a distance from the first aperture for refracting a second portion of said incoming light, and the second convex lens, wherein said second convex lens is arranged at the second aperture for refracting said outgoing light so as to collimate said outgoing light.

16. A method for producing collimating optics comprising:
determining start values of parameters of the collimating optics, said parameters being related to the shape of first and second convex lenses of said collimating optics and to the shape of a wall element of a reflection collimator, based on a theoretical model of the collimating optics;
optimizing a merit function with respect to the parameters of the collimating optics using the determined start values as initial values, wherein the merit function comprises a first target function directed to a desired full width half maximum (FWHM) beam angle and a second target function directed to a maximal light intensity in the center of a light beam output from the collimating optics when said collimating optics are employed with a light source; and
producing said collimating optics having the parameters optimized in accordance with said optimizing,
wherein the light source comprises light emitting diode lights (LEDs), and wherein the collimating optics comprise:
the reflection collimator, said reflection collimator having a first aperture for receiving an LED light and for allowing incoming light from the LED light to enter said collimator and a second aperture for allowing outgoing light to exit said collimator, the reflection collimator further having a wall element extending from said first aperture to said second aperture and having an inner reflective surface for reflecting a first portion of said incoming light from said first aperture towards said second aperture,
the first convex lens, wherein the first convex lens is arranged at a distance from the first aperture for refracting a second portion of said incoming light, and
the second convex lens, wherein said second convex lens is arranged at the second aperture for refracting said outgoing light so as to collimate said outgoing light,
wherein the second convex lens has a smaller area than that of the second aperture and wherein the method further comprises determining a diameter of the first convex lens based on a desired ratio between light energy of the second portion of said incoming light and light energy of the first portion of said incoming light.

17. The method of claim 15, wherein the wall element comprises a first portion that is configured to reflect and diverge incoming light incident on the first portion such that said reflected, divergent light is guided away from the second convex lens.

18. The method of claim 17, wherein the first portion of the wall element comprises the first aperture and wherein the wall element comprises a second portion comprising the second aperture, wherein the second portion of the wall element is configured to reflect and collimate incoming light incident on the second portion.

19. The collimating optics of claim 1, wherein the second convex lens has a smaller area than that of the second aperture.

* * * * *